United States Patent Office.

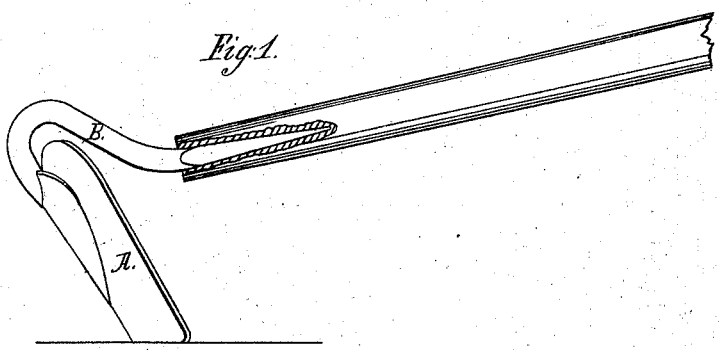
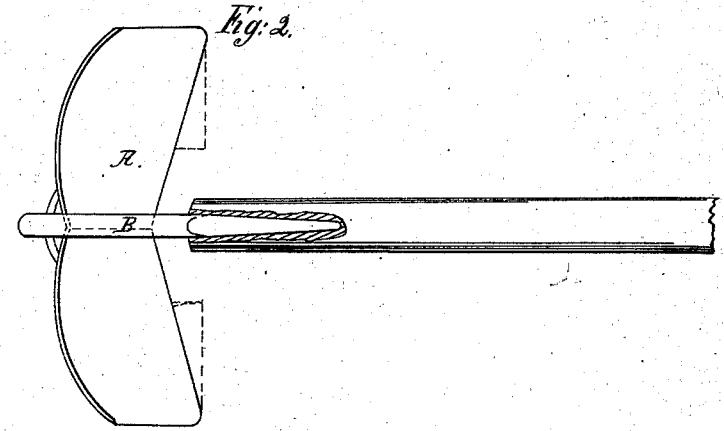
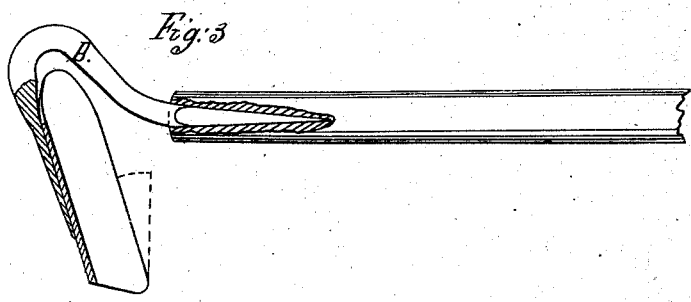

IMPROVEMENT IN HOES.

A. C. KASSON, OF MILWAUKEE, WISCONSIN, ASSIGNOR TO HIMSELF AND NELSON C. GRIDLEY.

Letters Patent No. 60,195, dated December 4, 1866.

SPECIFICATION.

TO ALL WHOM IT MAY CONCERN:

Be it known that I, A. C. KASSON, of Milwaukee, in the county of Milwaukee, and State of Wisconsin, have invented a new and improved Hoe; and I do hereby declare that the following is a full, clear, and exact description thereof, which will enable others skilled in the art to make and use the same, reference being had to the accompanying drawing forming part of this specification.

My invention consists in a hoe so constructed that the edge of the blade from the centre to each outer corner describes an obtuse angle, and the two sides of the blade from the centre outward are bent toward each other, and toward the handle. By such construction three hoes in one are obtained, as the blade can be used either on the edge proper, (which by reason of the curve is well adapted for scraping purposes, collecting dirt, &c.,) or on either side; and, when in the latter position, the blade is at an acute angle with the handle, which renders the operation of hoeing much easier.

A designates the hoe blade, B its tang, the latter being riveted to the back of the hoe in the usual manner. The edge of the blade A is not cut on a parallel line, as in ordinary hoes, but it is cut from the sides up toward the centre, thus causing the line of the edge of the blade to describe an obtuse angle, as shown in fig. 2. The blade is then bent at its centre, so that the two sides will constitute wings directed inward or toward the handle for a proper distance, thus giving to the hoe the advantage of a scoop hoe for collecting dirt, &c., and for depositing the same at a given point as it is drawn along. It will be observed by reference to fig. 2, that if the tang of the blade is pointed in a proper direction, and the handle be taken in the hands of the operator, the edge of the blade, when the blade is properly inclined, will rest truly and evenly upon the ground; hence all the advantages of the common hoe are obtained, besides the advantages of constructing the hoe so that it will answer for collecting dirt, as aforesaid. Now a proper direction having been given to the tang of the hoe, the blade is placed at an angle relatively with the handle; therefore, if the tang be turned so that one of its sides rests upon the ground, as shown in fig. 3, an ordinary hoe will be produced, with the exception that, by reason of the angle which the blade describes with the handle, the drawing of the hoe is much more easy and its manner of depositing the dirt is that desired by farmers when hilling potatoes, corn, or other crops. The opposite side of the hoe can be used in a like manner to the one described. Thus it will be seen by my invention a three-edged hoe is produced, or three hoes in one.

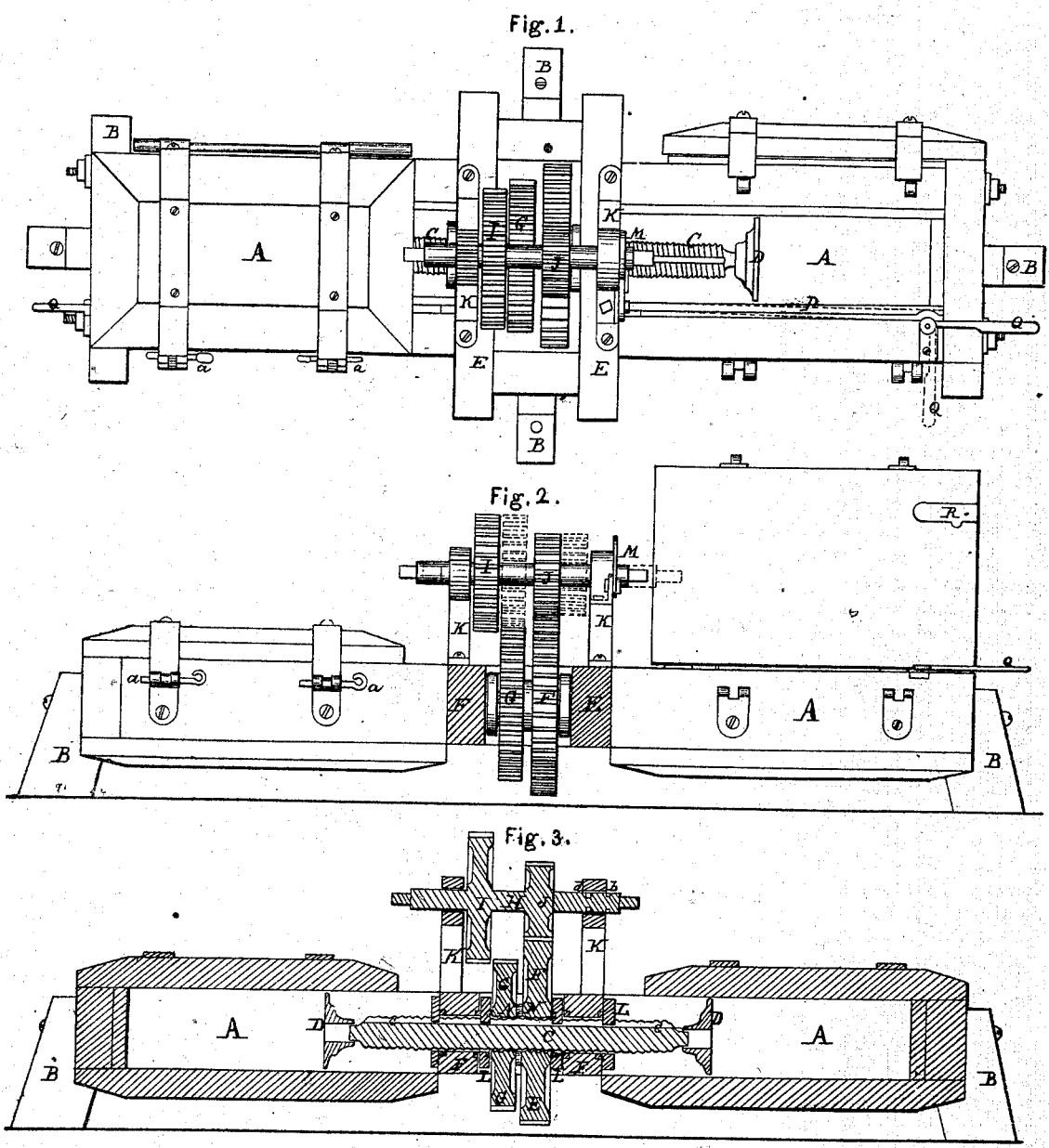

What I claim as new, and desire to secure by Letters Patent, is—

A hoe made substantially as herein shown and described; that is to say, constructing the edge proper at an angle, and setting the blade at such angle relatively with the handle, that the two opposite sides of the hoe will operate upon the earth substantially as and for the purpose specified.

A. C. KASSON.

Witnesses:
CHAS. H. RAYMER,
GEORGE SCHRODER.